Dec. 28, 1943.   N. P. VLAHOYANNES   2,338,017
HYDRAULIC TRANSMISSION
Filed June 2, 1941   2 Sheets-Sheet 1

Inventor
N. P. Vlahoyannes,
By Bernard F. Harvey
Attorney

Dec. 28, 1943.  N. P. VLAHOYANNES  2,338,017
HYDRAULIC TRANSMISSION
Filed June 2, 1941  2 Sheets-Sheet 2
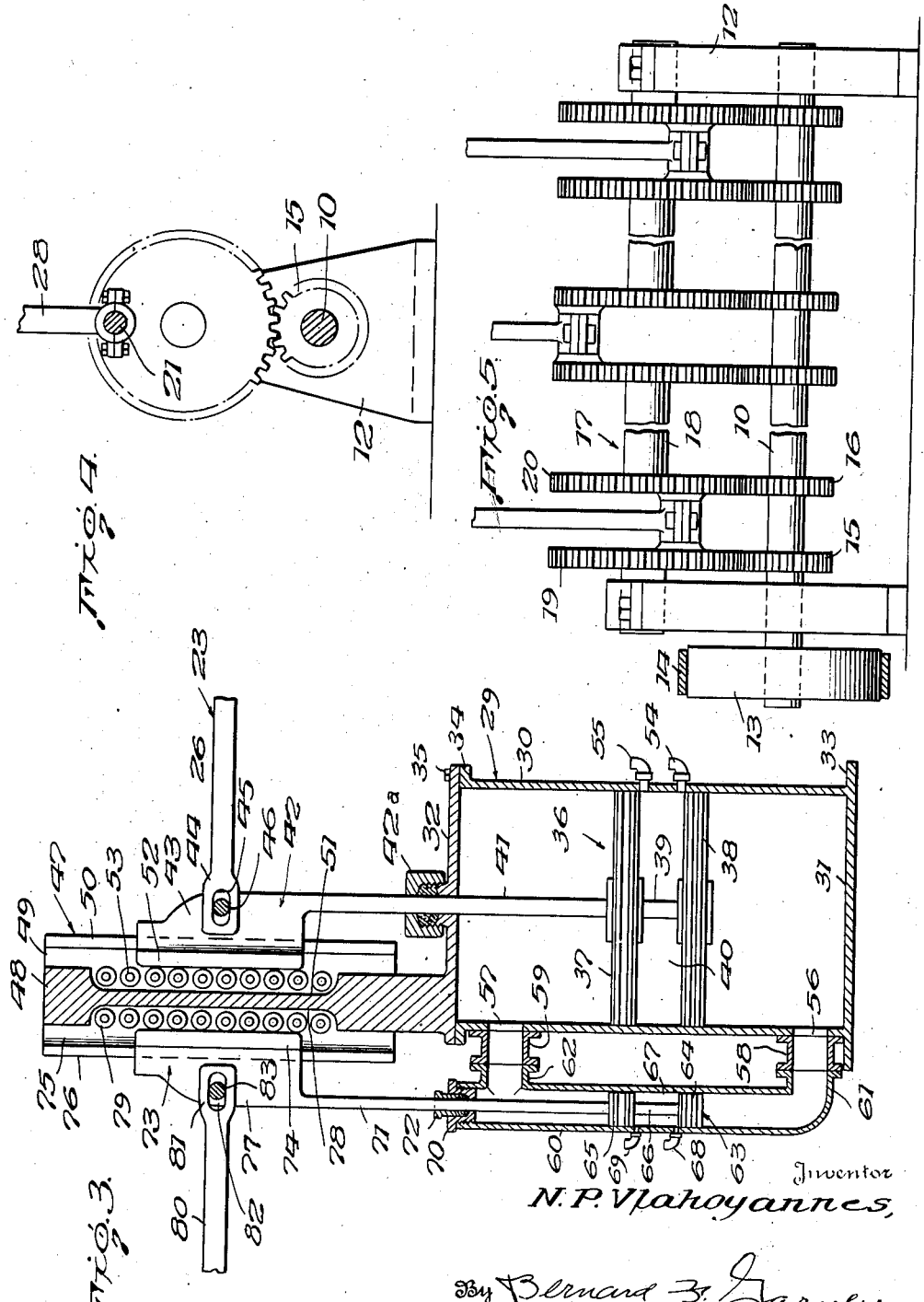
Inventor
N. P. Vlahoyannes,
By Bernard F. Garvey
Attorney Patented Dec. 28, 1943

2,338,017

UNITED STATES PATENT OFFICE 2,338,017

HYDRAULIC TRANSMISSION

Nickolas P. Vlahoyannes, Shreveport, La.

Application June 2, 1941, Serial No. 396,331

2 Claims. (Cl. 60—54.5)

This invention relates to power transmitting devices.

An object of this invention is to provide a power transmitting device acting through a rockable pitman and a hydraulic means whereby the power applied to the pitman can be transmitted to one or more additional pitmans without substantial loss of power.

Another object of this invention is to provide a power transmitting device of this kind whereby the degree of vertical rocking of the driving pitman can be transmitted to a remote driven pitman, and the degree of vertical rocking of the driven pitman may be equal to, more or less than, the driving pitman.

A further object of this kind is to provide a power transmitting device of this kind including a driving pitman, a driven pitman operatively connected with a driven element, an intermediate pitman, a hydraulic connection between the driving pitman and the intermediate pitman, and a second hydraulic connection between the intermediate pitman and the driven pitman, the hydraulic connections being so constructed as to provide the desired rocking movement of the driven pitman irrespective of the degree of rocking movement of the driving pitman.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a top plan of a series of power transmitting devices constructed according to an embodiment of this invention.

Figure 3 is a vertical sectional view of one of the hydraulic units.

Figure 4 is a fragmentary sectional view taken on the line 4—4 of Fig. 1.

Figure 5 is a fragmentary sectional view taken on the line 5—5 of Fig. 1.

Figures 1, 2:
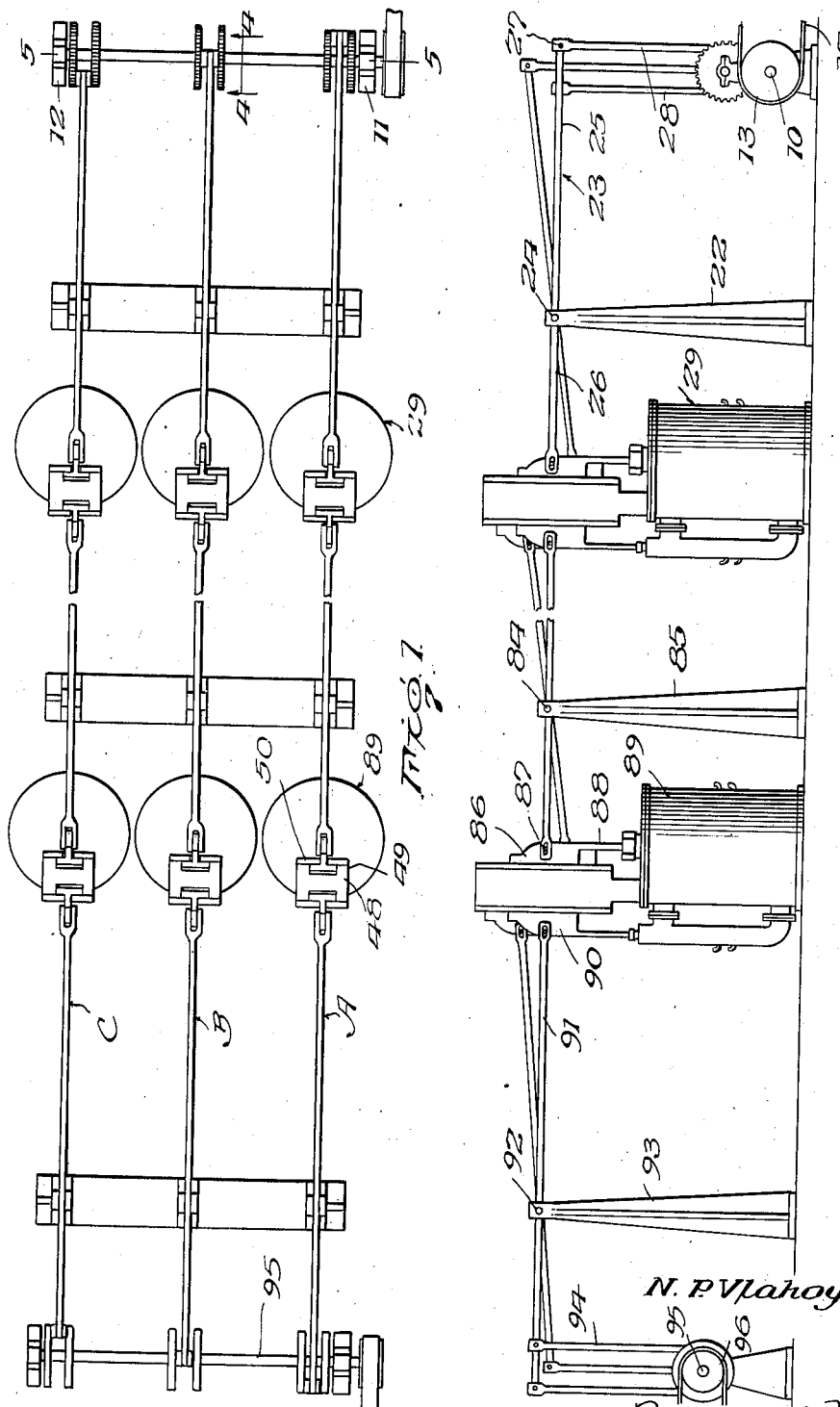
Figure 2 is a detail side elevation of the apparatus.

Referring to the drawings, the numeral 10 designates a drive shaft which is journalled in a pair of spaced apart bearing standards 11 and 12. The shaft 10 has a pulley 13 fixed to one end thereof, and a driving belt 14 is trained about the pulley 13 and also about a power pulley (not shown). The shaft also has fixed thereto a gear 15 and a gear 16 which is spaced from the gear 15. A crankshaft, generally designated as 17, is journalled between the bearing standards 11 and 12 above the driving shaft 10. The crankshaft 17 includes a main shaft member 18 which has fixed thereto or formed integrally therewith a pair of spaced apart gear members 19 and 20 which are adapted to mesh with the driving gears 15 and 16, respectively, and an offset crank pin 21 is secured between each pair of gear members 15 and 16.

A vertically disposed pitman standard 22 is disposed in forwardly spaced relation with respect to the bearing standards 11 and 12, and a pitman 23 is rockably mounted as at 24 on the upper portion of the standard 22. The pitman 23 has a long lever portion 25 extending rearwardly of the pivot 24, and a short lever portion 26 extending forwardly of the pivot 24. The rear end of the lever portion 25 is pivotally connected as at 27 to the upper end of a connecting rod 28, the lower end of the connecting rod 28 being pivotally mounted on the crank pin 21.

A vertically disposed hydraulic cylinder, generally designated as 29, is disposed forwardly of the pitman standard 22, and includes a cylindrical body 30, a lower head 31, and an upper head 32. The lower head 31 projects horizontally and outwardly of the periphery of the body 30, as at 33, and forms with the lower head 31 a base structure for the cylinder 29. The upper end of the body 30 is formed with an outwardly extending flange 34, and the upper head 32 is secured on the flange 34 by fastening devices 35.

The cylinder 29 has slidable therein a piston structure generally designated as 36, and the piston structure 36 includes a pair of vertically spaced apart piston members 37 and 38. A short connecting rod 39 is fixed to and disposed between the piston members 37 and 38, and the space 40 between the piston members 37 and 38 constitutes an oil chamber within which oil is adapted to be positioned for constantly lubricating the piston members 37 and 38 and the wall of the cylindrical body 30.

A piston rod 41 is fixed to the upper piston member 37 and extends upwardly therefrom and through a gland 42a carried by the upper head 32. The upper end of the piston rod 41 is fixed to or formed integral with a T-shaped head or slide 42, and the head or slide 42 has straddling the stem portion 43 thereof the bifurcated forward end 44 of the pitman 23. The bifurcated end 44 of the pitman 23 is provided with an elongated slot 45 in each arm thereof, and a pin 46 extends through the stem 43 and is slidable in the slots 45 of the arms of the bifurcated end 44 of the pitman 23.

The head or slide 42 is vertically slidable in a vertically disposed guide generally designated as 47 which is mounted upon and extends upwardly from the upper head 32. The guide 47 includes a vertically disposed body 48 formed with a pair of guide flanges 49 disposed in spaced apart parallel relation, and a plate 50 is fixed to each flange 49 and extends inwardly therefrom, as shown in Fig. 1, so as to slidingly hold the head or slide 42 in the guide structure 47. The guide body 48 is formed with a vertically disposed cutout 51 confronting the flanged portion 52 of the head or slide 42, and a plurality of rollers or anti-friction elements 53 are rotatably mounted in the cutout 51 and engage against the inner side of the flanged portion 52 of the head or slide 42.

The cylinder or body 30 has secured thereto a pair of vertically spaced apart filler members 54 and 55 which are adapted to communicate with the oil chamber 40 so that oil may be discharged into the chamber 40 in any position of the piston structure 36. When the piston structure 36 is in its lowermost position oil may be discharged into the chamber 40 through the lower filler member 54, and the oil may be discharged into the chamber 40 when the piston structure 36 is in its uppermost position through the filler member 55. When the piston structure is in an intermediate position, as shown in Fig. 2, oil may be discharged into the chamber 40 through either or both filler members 54 and 55.

The cylinder or body 30 is provided adjacent the lower end thereof with a fluid port 56, and is provided adjacent the upper end thereof with a fluid port 57. A lower nipple 58 is fixed to the cylinder or body 30 and communicates with the cylinder 30 through the port 56. An upper nipple 59 is fixed to the cylinder 30 and communicates with the cylinder 30 through the upper port 57.

A reduced diameter cylinder 60 is disposed in spaced parallel relation with respect to the cylinder 30, and is provided at its lower end with an angularly disposed extension 61 which is fixed to the nipple 58. A flanged nipple 62 is carried by the cylinder 60 adjacent the upper portion thereof and is fixed to the flanged nipple 59, so that the fluid from the lower portion of the cylinder 30 will be forced into the lower portion of the piston 60 through the port 56, and the fluid from the upper portion of the cylinder 30 will be forced into the upper portion of the cylinder 60 through the port 57.

A driven piston structure, generally designated as 63 is slidable in the cylinder 60, and includes a lower piston member 64, an upper piston member 65, and a short connecting rod 66. The space 67 between the piston members 64 and 65 constitutes an oil chamber, and oil is adapted to be discharged into the chamber 66 through a pair of vertically spaced apart filler members 68 and 69. A cylinder head 70 is threaded into the upper end of the cylinder 60, and a vertically disposed connecting rod 71 which is connected at its lower end to the piston structure 63 extends through the head 70, and is slidingly sealed relative to the head 70 by means of a gland 72.

A T-shaped sliding head 73 is fixed to or formed integral with the upper end of the connecting rod 71, and the head 73 has the flanges 74 thereof disposed between outwardly extending flanges 75 carried by the guide body 48, and a pair of plates 76 are fixed to the outer edges of the flanges 75 and engage on opposite sides of the stem portion 77 of the head 73. The guide 48 is formed with a second cutout 78 opposite from the cutout 51, and a plurality of rollers or anti-friction elements 79 are rotatably disposed in the cutout 78 and engage again the inner face of the head 73.

An intermediate pitman 80 formed with a fork 81 at its rear end is provided with an elongated slot 82 in each arm of the fork through which a pin 83 engages. The intermediate pitman 80 is rockably mounted as at 84 on the upper end of an intermediate pitman standard, and the forward end of the intermediate pitman 80 is pivotally and slidingly engaged with a sliding head 86 as indicated at 87. The sliding head 86 is connected by means of a connecting rod 88 to a forward hydraulic unit, generally designated as 89. The details of construction of the hydraulic unit 89 are similar in every detail to the details of construction of the first hydraulic unit 29.

The unit 89 is provided with a driven sliding head 90 with which a forward pitman is pivotally and slidingly connected. The forward pitman 91 is rockably mounted as at 92 on the upper end of a forward pitman standard 93, and the forward end of the pitman 91 is pivotally connected to the upper end of a vertically disposed connecting rod 94. The lower end of the connecting rod 94 is pivotally connected to the offset crank pin of a driven crankshaft 95 having a driven pulley 96 fixed thereto, and the pulley 96 has a driven belt 97 trained thereabout. The belt 97 is adapted to be connected to a suitable driven element (not shown) which is adapted to be operated from the drive shaft 10.

The hereinbefore described hydraulic power transmitting apparatus forms a single power transmitting unit or section which in Fig. 1 is given the general designation A. As shown in Fig. 1 there are three power transmitting units or sections A, B and C which are of identical construction, the units or sections B and C being similar in detail to each other and to the unit or section A, hereinbefore described. Preferably the forward and rear ends of the units B and C are connected with the driven and driving shafts 95 and 10, respectively, at circumferentially offset points so that no more than one crank pin will be on dead center at one time.

In operation, the drive shaft 10 is rotated by means of the belt 14. Rotation of the shaft 10 will vertically rock the rear pitman 23 and reciprocate the piston structure 36 within the cylinder 30. The cylinder 30 is adapted to have a liquid disposed therein on opposite sides of the piston structure 36, and a lubricating liquid, such as oil or the like, is adapted to be positioned in the chamber 40. As the piston structure 36 moves downwardly the liquid in the lower portion thereof will be forced out through the lower port 56, and the driven piston structure 63 will be forced upwardly. The liquid in the cylinder 60 above the piston structure 63 will be forced back into the cylinder 30 through the upper port 57. A relatively short vertical movement of the driving piston structure 36 will produce a correspondingly long vertical movement for the piston structure 63 which is translated through the forward hydraulic unit 89 into rotary motion with respect to the driven shaft 95. The ratio of lever arms 25 and 26 to the pistons are such that the speed of the driven shaft 95 will be proportional to the speed of the shaft 10 and no trapping of liquid will occur.

It will be understood that the length of movement of the driven piston structure 63 will be determined by the differences in the diameters of the cylinders 30 and 60 and the movement of the driving piston structure 36.

What is claimed is:

1. In a power transmitting apparatus, a hydraulic power transferring structure comprising a vertically disposed driving cylinder, a driving piston slidable in said cylinder, a driven cylinder disposed laterally of said driving cylinder and having a diameter substantially less than the diameter of said driving cylinder, a driven piston slidable in said driven cylinder, a vertically disposed guide means carried by said driving cylinder, a T-shaped driving head slidably engaging said guide means, means connecting said driving head with said driving piston, a T-shaped driven head slidably engaging said guide means laterally of said first head, means connecting said driven head with said driven piston, means for reciprocating said driving head, and means whereby the movement of said driven piston and driven head may be connected with a driven element.

2. In a power transmitting apparatus, a hydraulic power transferring structure comprising a vertically disposed driving cylinder, a driving piston slidable in said cylinder, a driven cylinder disposed laterally of said driving cylinder and having a diameter substantially less than the diameter of said driving cylinder, means communicating said cylinders with each other adjacent opposite ends thereof, a vertically disposed guide means carried by said driving cylinder, a T-shaped driving head slidably engaging said guide means, means connecting said driving head with said driving piston, a T-shaped driven head slidably engaging said guide means oppositely from said first head, means connecting said driven head with said driven piston, vertically disposed anti-friction elements carried by said guide means and engageable with said heads, means for vertically moving said driving head, and means whereby the movement of said driven head may be connected with a driven element.

NICKOLAS P. VLAHOYANNES.